W. GRIKSCHEIT.
DRAIN PLUG.
APPLICATION FILED JAN. 2, 1920.
1,433,001.
Patented Oct. 24, 1922.
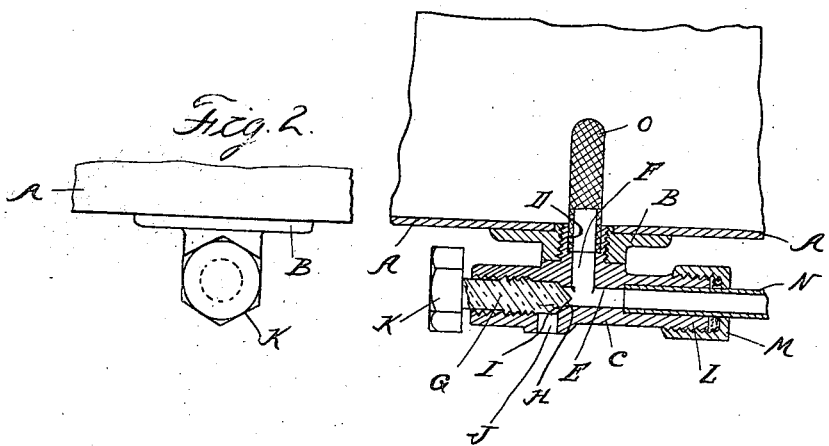

Patented Oct. 24, 1922.

1,433,001

UNITED STATES PATENT OFFICE.

WILLIAM GRIKSCHEIT, OF DETROIT, MICHIGAN, ASSIGNOR OF ONE-HALF TO THOMAS B. MOTHERSILL, OF WINDSOR, ONTARIO, CANADA.

DRAIN PLUG.

Application filed January 2, 1920. Serial No. 348,380.

*To all whom it may concern:*

Be it known that I, WILLIAM GRIKSCHEIT, a citizen of the United States of America, residing at Detroit, in the county of Wayne and State of Michigan, have invented certain new and useful Improvements in Drain Plugs, of which the following is a specification, reference being had therein to the accompanying drawings.

The invention relates to drain plugs and has for its object the obtaining of a construction in which the drain valve is incorporated in the fitting forming a conduit connection. It is the further object to obtain an arrangement in which but slight clearance is required. To this end, the invention consists in the construction as hereinafter set forth.

In the drawings:

Figure 1 is a longitudinal section through the drain plug;

Figure 2 is an end elevation thereof.

In many places such, for instance, as for use on fuel tanks on motor vehicles, it is usual to connect the conduit to the bottom of the tank. It is also usual to provide a drain cock and in some instances this is attached to the fitting to which the conduit is connected. With the latter construction the drain cock extends downward a considerable distance from the bottom of the tank, which is objectionable as restricting road clearance. With my improved construction I have provided a drain cock incorporated in the fitting which forms the connection for the conduit without increasing the depth of said fitting, or any other connected part. I have also obtained a simple and inexpensive construction to manufacture.

As shown, A is the tank which is provided in its bottom with an aperture surrounded by the threaded bushing escutcheon B. C is my improved fitting, which is of substantially T form having an upwardly-extending threaded nipple D forming a stub extension for engagement with the bushing B and provided with a shoulder to abut said bushing. The head portion of the T extends horizontally and is provided with an aperture E extending completely therethrough and intersecting with the aperture F through the nipple D. On one side of the point of intersection with the passage F the passage E is counterbored and is internally threaded for the engagement of a valve stem G. The inner end of this stem has a conical valve face H adapted to engage a seat I, which is between the passage F and a downwardly directed discharge port J. The stem G is provided at its outer end with a polygonal head K, by means of which it may be adjusted towards or from said seat. L is a threaded nipple at the opposite end of the T-head, which is engaged by a packing gland M for securing thereto the conduit N.

With the construction as described, the fitting is attached to the tank by screwing the nipple D into the bushing B and if desired, a strainer O may be secured in a counterbore in said nipple to project upward into the tank. The valve stem G is normally in a position where the valve H is in contact with the seat I, so as to cut off the port J. However, whenever it is desired to drain the tank, the polygonal head K may be turned by means of a suitable wrench, thereby withdrawing the vlave from its seat and opening communication with the drain port J. Inasmuch as the valve stem is arranged horizontally, there is nothing projecting downward to interfere with road clearance.

What I claim as my invention is:

1. A drain valve for fuel tanks, comprising a one piece T-shaped casing the stem of said casing comprising an upwardly-extending threaded nipple forming a stub extension adapted to be secured into the escutcheon of the tank and provided with a shoulder to abut said escutcheon, means for connecting a conduit to one end of the T-head, and a valve engaging the opposite end of said T-head for opening communication with a drain port.

2. A drain valve for fuel tanks, comprising a one piece substantially T-shaped casing the stem of said casing comprising a stub extension adapted to be secured into the escutcheon of the tank and provided with a shoulder to abut said escutcheon, means for attaching a conduit to one end of the head of said T, a valve stem having a threaded engagement with the opposite end of the head of the T and controlling a downwardly directed drain port, and a polygonal head on said valve stem for adjusting the same.

3. A drain valve for fuel tanks comprising a substantially T-shaped casing the stem of said casing comprising a stub extension adapted to be secured into the escutcheon of the tank and provided with a shoulder to abut said escutcheon, and an externally threaded nipple at one end of the T-head, said casing having a passage extending completely through said T-head and intersecting with the passage through the stub extension, a valve stem engaging an internally threaded portion of the passage through the T-head at the opposite end of said T-head, a seat for the valve arranged adjacent to a downwardly directed drain port, and a polygonal head for the outer end of said stem.

4. A combined drain valve fitting and conduit connection for fuel tanks, comprising a substantially T-shaped casing formed of a single piece of metal the stem of said casing comprising a stub extension adapted to be secured into the escutcheon of the tank and provided with a shoulder to abut said escutcheon, the T-head having a passage extending horizontally therethrough and intersecting a vertical passage extending through said stub extension, there being provided a drain port communicating with said horizontal passage at one side of said vertical passage, a valve engaging a threaded portion of said horizontally extending passage, a seat for said valve between said port and vertical passage, and a polygonal head for said valve stem.

5. A drain valve for fuel tanks comprising a one piece T-shaped casing the stem of said casing comprising an upwardly extending threaded nipple forming a stub extension adapted to be secured into the escutcheon of the tank and provided with a shoulder to abut said escutcheon, and an externally threaded nipple at one end of the T-head, said casing having a passage extending completely through said T-head and intersecting the passage extending through said upwardly extending nipple, a valve stem provided with a conical end portion engaging an internally threaded portion of said passage through the T-head at the opposite end of said T-head, a seat for the valve arranged adjacent to a downwardly directed port and means upon said valve stem for rotating the same.

In testimony whereof I affix my signature.

WILLIAM GRIKSCHEIT.